Figure 2:
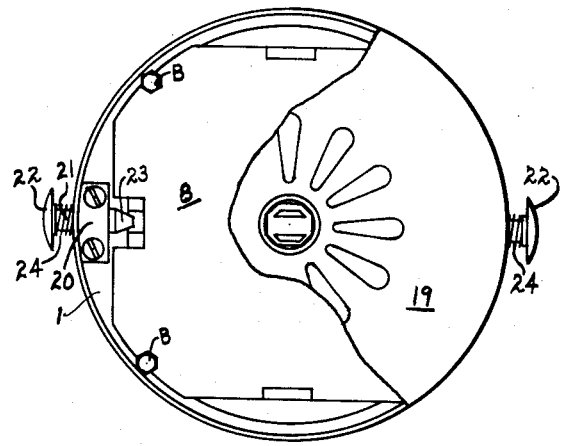

Nov. 3, 1959  H. M. JOY ET AL  2,911,548

ELECTRIC MOTOR

Filed Oct. 7, 1955

INVENTORS
HENRY M. JOY, ANTHONY G. HORVATH,
AND ELMER F. STEGER
BY Tom Walker

United States Patent Office 2,911,548
Patented Nov. 3, 1959

2,911,548

ELECTRIC MOTOR

Henry M. Joy, Anthony G. Horvath, and Elmer F. Steger, Dayton, Ohio, assignors, by mesne assignments, to Reliance Electric and Engineering Company, Cleveland, Ohio, a corporation of Ohio Application October 7, 1955, Serial No. 539,117

7 Claims. (Cl. 310—77)

This invention relates to electric motors, and more particularly to a new and improved brake mechanism and brake system therefor.

An improved D.C. brake mechanism of a spring-setting magnetic release type is provided in accordance with the invention. This mechanism is connected in a novel and simple manner to the motor in which it is incorporated to provide a highly compact, efficient and improved motor unit. The improved unit employs a single D.C. "doughnut" brake coil operated through a dry rectifier from a tap off the field of the motor in which it is incorporated. The nature of the system in effect provides an integration of the brake mechanism into the motor in which it is employed.

Previous brake mechanisms for electric motors have been generally bulky and weighty as to the structure employed. They include the traditional laminated A.C. magnets, heavy armature and follower plates, and complicated wear adjustment apparatus. In particular, A.C. brake mechanisms of the prior art employ several separate brake coils as compared to the single coil necessary in the invention apparatus by which reduction in cost, weight and size is effected. Previous D.C. brake mechanisms have most generally required separate sources of power for their operation, resulting in cost and space problems.

The improvements generally effected by the present apparatus and system relative to electric brake mechanisms of the prior art, include greater simplicity of construction and maintenance, continuous direct control of the brake through the motor so that brake action is quick and sure, and a reduction of brake components to a minimum with a corresponding increase in efficiency of brake operation.

The object of the invention is to simplify the construction as well as the means and mode of operation of electric brake motors, whereby such motors may not only be economically manufactured, but will be more efficient and satisfactory in use, adaptable to a wide variety of applications, and be unlikely to get out of repair.

A further object of the invention is to provide a new and improved electric brake mechanism which is simple, compact, efficient and relatively inexpensive.

Another object of the invention is to provide an improved D.C. brake mechanism for use in combination with an A.C. motor employing a single D.C. brake coil operated through a rectifier from a tap off the field of the motor, the brake coil operating in conjunction with a spring-setting magnetic release type of braking unit of a compact improved nature.

An additional object of the invention is to provide for integral incorporation in an A.C. motor of an improved brake unit and system of a compact lightweight nature which is easy and quick to assemble and simple to service, including means for simple wear adjustment.

A further object of the invention is to provide an electric brake motor possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Figure 1:
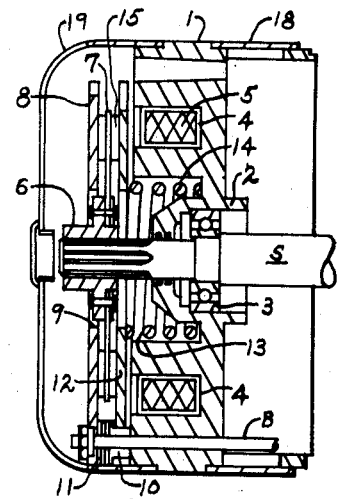
Figure 3:
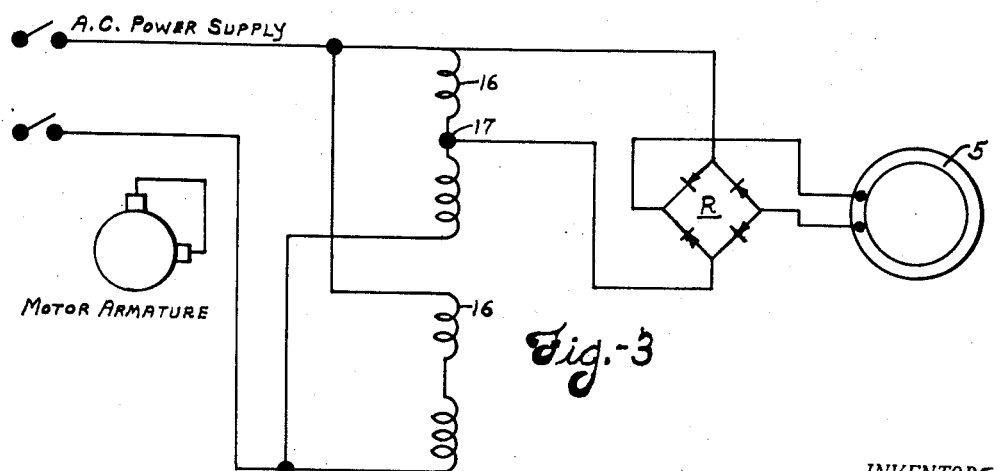

Referring to the accompanying drawing wherein is shown one but obviously not necessarily the only form of embodiment of the invention, Fig. 1 shows a cross-sectional view of the brake head section of an A.C. motor incorporating the subject invention;

Fig. 2 shows in partial section an end view of the brake section shown in Fig. 1; and Fig. 3 is a schematic of the simplified brake control circuit provided.

Like parts are indicated by similar characters of reference throughout the several views.

The brake section shown in Fig. 1 provides an extension of the motor in which it is incorporated and the brake head 1 is secured to the motor by the motor tie bolts B. The brake head 1 has a recessed inwardly extending hub portion 2. A motor shaft S extends centrally through the hub portion 2 and a bearing 3 seated in the recess of said hub supports the shaft S for rotation relative the brake head.

An annular groove 4 is provided in the outer face of the brake head to receive a single "doughnut" type D.C. brake coil 5 in nesting relation therein, held in assembled relation by a wax filler. The outer end of the motor shaft S is splined as shown in Fig. 1 of the drawings and it mounts a spider element 6 in longitudinally slidable relation thereon. The spider 6 although slidable on shaft S is rotatable with the shaft. An annular brake disc 7 is fixed to the spider 6 as by rivets for rotation therewith.

Mounted on the tie bolts B adjacent the outer ends thereof is a brake follower plate 8 centrally apertured at 9. Armature plate nuts 10 are mounted on bolts B in abutting relation to the brake head and washers 11 are also mounted on the bolts interposed between the nuts 10 and the follower plate 8 fixing the plate 8 in a predetermined position relative the brake head. The inner surface of the follower plate opposite the brake disc 7 has a disc of friction material bonded thereto.

The nuts 10 have reduced diameters adjacent the brake head to provide an abutment shoulder at the outer end thereof. Mounted on the reduced portions of the nuts 10 for movement longitudinally thereof in slidable fashion relative thereto and to the motor shaft S is an armature plate 12. In the outer surface of the brake head 1 opposite the armature plate 12 is a central recess 13 which seats a coil spring 14 therein abutting the brake head at its inner end and the armature plate at its outer end. The spring is set to urge the armature plate to engage the brake disc 7. The armature plate 12 has a friction disc 15 bonded to the surface thereof opposite the brake disc.

Referring to the schematic circuit of Fig. 3 in connecting the brake coil 5 in operative relation to the motor circuit, the stator winding 16 of the motor is tapped as at 17 so that when the motor is operating alternating current is directly supplied thereby to the input of a dry rectifier R mounted by any suitable means to the follower plate 8. The output of the rectifier is connected to the single brake coil 5. Thus, when the motor has a power source connected thereto, the brake coil 5 is being continuously provided with D.C. current through the rectifier maintaining it in an energized condition. The armature plate is thereby attracted in opposition to the bias of the coil spring 14 and its engagement with the braking disc 7 is prevented.

As shown in Fig. 1 of the drawings, the coil is in its deenergized condition whereupon the armature plate is released to be biased by spring 14 into frictional engagement with the brake disc 7 through its friction disc 15. The bias of the coil spring further causes a biasing of the brake disc 7 into engagement with the follower plate friction disc so that a complete instantaneous and positive brake action on the shaft S occurs on cutting of power to the motor.

A brake head cover 18 is provided at the inner side thereof and a brake shroud 19 encloses the outer end of the brake assembly. Mounted to opposed sides of the brake head 1 by bolts or other suitable means are brackets 20 to support manual brake release means. The brake release means comprise a brake release pin 21 slidably mounted in each bracket 20 and arranged to be diametrically aligned. An operating head 22 is secured to the outer end of each pin 21 and a wedge shaped operating member 23 is secured to the inner end of each pin 21. The wedge members 23 extend to points immediately adjacent the armature plate and the brake disc in their braking condition and are normally so maintained by the bias of springs 24 mounted on the outer ends of the pins abutting their respective operating heads and the brake shroud. Accordingly, when the brake elements are in a braking condition, and it is necessary to manually release them, the pins 21 are forced inwardly against the bias of springs 24. This causes the wedge elements 23 to extend in wedging relation between the engaged armature plate and braking disc to quickly and easily disengage the brake to release the motor shaft S. Upon energization of the motor and brake winding 5, the armature plate is retracted, thereby freeing the pins 21—23 for return to normal position under influence of their retractile springs 24.

Thus, a simple and efficient brake mechanism and system is obtained. In operation of a motor in accordance with the invention, when the motor is started, the D.C. brake coil, which is directly supplied from the motor winding, is energized. The armature plate is thereby held back against the tension of the brake spring 14. Drag or any type of braking action on the motor shaft is thereby prevented until power to the motor is cut and braking action is required. As soon as the power to the motor is cut, the braking action is sure and almost instantaneous with the armature, spring driven, engaging the brake disc 7 and locking it to the follower plate 8 for immediate braking action assisted by the bonded friction discs provided.

The action of this braking mechanism is smooth and quiet. The use of a single D.C. control coil not only means a reduction in cost of the brake mechanism, but also means that a considerable reduction in the amount of heat generated when compared with the usual A.C. systems of the prior art.

The invention eliminates laminated pole pieces, and cores found in A.C. circuits, and provides a light-weight compact unit which is quieter than the more conventional A.C. circuits. The unit is completely enclosed, but readily accessible for easy and facile servicing. The coil can be easily replaced due to the simple nesting arrangement employed. Brake wear adjustment is very simple, since by removing washer elements 11 from the tie bolts B, any necessary adjustment can be quickly effected.

It should be noted that the invention promotes a distinct advance in the art by the integration of the D.C. brake control circuit into the A.C. motor control circuit with which it is employed.

While, as pointed out above, the present disclosure provides an unusually quiet unit, in some applications it may be found desirable to make the present unit even quieter. This may be easily done by interposing on either the face of the brake head 1 or on the back of the armature plate 12 a coating or layer of non-magnetic, non-metallic material. Although the D.C. brake unit is inherently quieter than the usual A.C. brake, the introduction of this coating further enhances the mechanical quietness of the unit.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A D.C. brake mechanism for A.C. motors comprising a braking element adapted for connection to the motor shaft to rotate therewith, a brake head adapted for fixed mounting to the motor, a D.C. brake coil mounted to said brake head, armature means, biasing means interposed between said armature means and said brake head to urge said armature means into frictional engagement with said braking element, a rectifier adapted for mounting to the motor, a tap from the motor field being connected to the input of said rectifier and to said coil from the output of said rectifier whereby as long as power is supplied to said motor, D.C. current will be directly supplied to energize said coil to attract the armature means thereby and prevent braking action, and on cutting of power to the motor, said coil will deenergize and instantaneous positive brake action will result by biased engagement of the armature means to said braking element, support means mounted to said brake head, opposed aligned plunger members mounted to said support means, wedge means on the inner ends of said plungers normally adjacent spaced points of said armature means and said braking element whereby on forcing of said plungers inwardly of said support means, said wedge members will wedge said armature means and braking element apart to release the motor shaft.

2. A D.C. brake mechanism for integral connection to A.C. electric motors comprising, a brake disc, means connected to said brake disc for slidable mounting thereof axially of the motor shaft and rotation therewith, a support means connected to the motor in bearing relation to the motor shaft, a D.C. coil seated in said support means, an armature plate coaxial with said brake disc, means connected to said support means mounting said armature plate for movement longitudinally of the shaft to one side of the brake disc, spring means seated in said support means and bearing on said armature plate urging it into engagement with said brake disc, brake follower means mounted in spaced connected relation to said support means to the other side of the brake disc, means directly connecting the field of the A.C. motor and said coil, supplying D.C. current thereto as long as a source of A.C. power is connected to said motor whereby on cutting of power to said motor, said spring means will cause said armature plate to positively and instantaneously engage said brake disc to said follower means to brake the motor shaft instantaneously thereby, a cover element for the motor shaft and associated brake elements mounted to said support means, opposed aligned plunger members mounted in said cover and having spring means connected thereto normally maintaining the inner ends of said plunger members adjacent the armature plate and said brake disc in their braking condition whereby, on demand, said plunger members may be forced inwardly of said cover, the inner ends thereof engaging between said armature plate and brake disc for disengagement thereof to free the motor shaft.

3. A brake mechanism including a braking element for connection to a motor shaft, braking means normally biased for braking engagement of said braking element, means for mounting to said motor to attract the braking means on supply of power to said motor whereby on cutting of power to said motor said braking means will instantaneously engage said braking element, and means for mounting to said motor in oppositely disposed positions relative said braking element including wedge means operable to disengage said braking element and braking means from a braked condition.

4. A brake mechanism for motors comprising a braking element adapted for connection to a motor shaft for rotation therewith, a brake head for fixed mounting to the motor, armature means, biasing means between armature means and said brake head to normally urge said armature means into frictional braking engagement with said braking element, means energizable as long as power is supplied to the motor to attract the armature means and prevent the braking action, and deenergizable on cutting of power to said motor so that instantaneous brake action will result by the biasing engagement of said armature means to said braking element, and support means for connection to said brake head having plunger elements mounted thereto, said plunger elements having means adjacent said armature means and braking element operable to wedge them apart to release said shaft from a braked condition.

5. A brake mechanism for motors comprising a braking element adapted for connection to a motor shaft for rotation therewith, a brake head for fixed mounting to the motor, armature means, biasing means between said armature means and said brake head to normally urge said armature means into frictional engagement with said braking element, means operative to prevent engagement of said armature means to said braking element during supply of power to said motor and inoperative on cutting of power to said motor so that instantaneous brake action will result by the biased engagement of said armature means to said braking element, support means for connection to said brake head having plunger elements mounted thereto, said plunger elements having means adjacent said armature means and braking element operable for wedging them apart to release said motor shaft from a braked condition.

6. A brake mechanism for an electric motor including a braking element for connection to the motor shaft, braking means normally biased for braking engagement of said braking element, means for mounting to said motor to attract the braking means on supply of power to said motor whereby on cutting of power to said motor said braking means will instantaneously engage said braking element, and means for mounting to said motor in adjacent operative relation to said braking element operable to engage said braking element and said braking means to disengage them from a braked condition.

7. A brake mechanism for a motor comprising, a braking element for connection to a motor shaft for rotation therewith, a brake head for fixed mounting to the motor, armature means, biasing means between said armature means and said brake head to normally urge said armature means to frictional braking engagement with said braking element, means energizable as long as power is supplied to the motor to attract the armature means and prevent the braking action and de-energizable on cutting of power to said motor so that instantaneous brake action will result by the biasing engagement of said armature means to said braking element, and means for connection to the motor mounting adjacent said armature means and braking element and operable to disengage them to release said shaft from a braked condition.

References Cited in the file of this patent

UNITED STATES PATENTS

| | | |
|---|---|---|
| 697,847 | Ihlder | Apr. 15, 1902 |
| 736,461 | Thresher | Aug. 18, 1903 |
| 844,997 | Cutler | Feb. 19, 1907 |
| 2,163,418 | Tisza et al. | June 20, 1939 |
| 2,217,464 | Arnold | Oct. 8, 1940 |
| 2,295,916 | Schiff | Sept. 15, 1942 |
| 2,377,930 | Fuller | June 12, 1945 |
| 2,383,669 | Moore | Aug. 28, 1945 |
| 2,414,924 | Borden | Jan. 28, 1947 |
| 2,434,034 | Chapman | Jan. 6, 1948 |
| 2,462,017 | Willits | Feb. 15, 1949 |
| 2,506,028 | LeTourneau | May 2, 1950 |

FOREIGN PATENTS

| | | |
|---|---|---|
| 527,782 | Great Britain | Oct. 16, 1940 |
| 703,143 | Great Britain | Jan. 27, 1954 |